No. 633,161. Patented Sept. 19, 1899.
J. SCHNEIBLE.
FILTER.
(Application filed Apr. 12, 1898.)
(No Model.) 2 Sheets—Sheet 1.
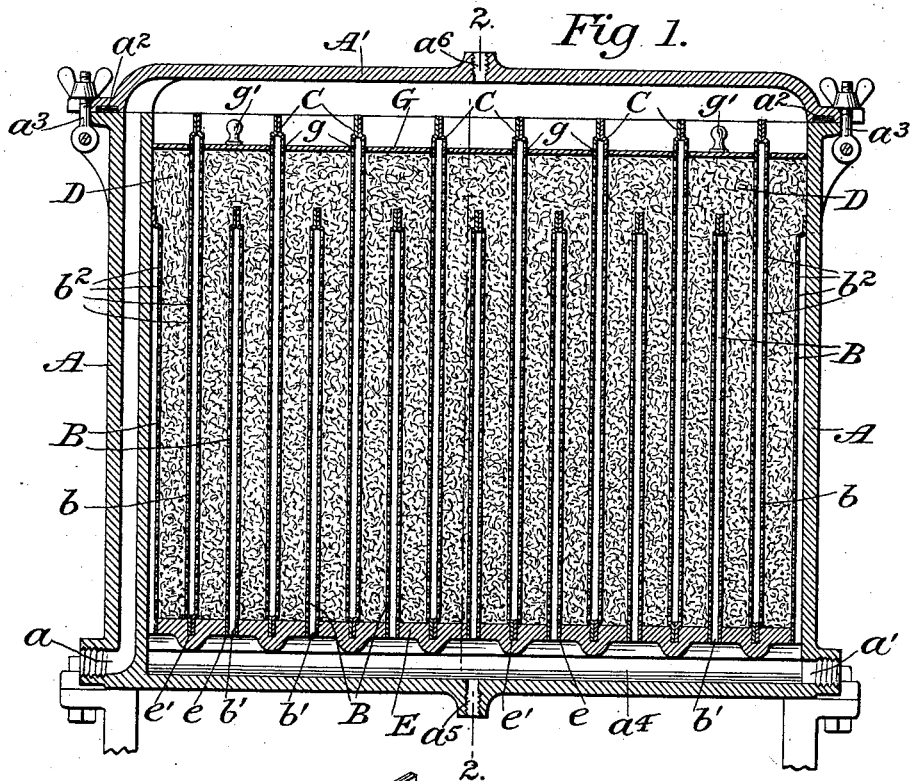
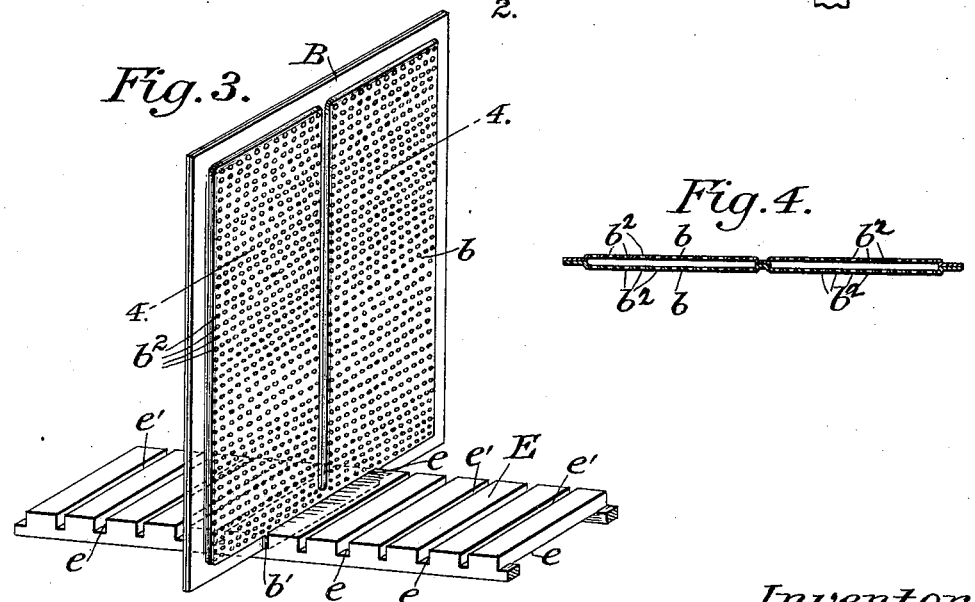

No. 633,161. Patented Sept. 19, 1899.
J. SCHNEIBLE.
FILTER.
(Application filed Apr. 12, 1898.)
(No Model.) 2 Sheets—Sheet 2.
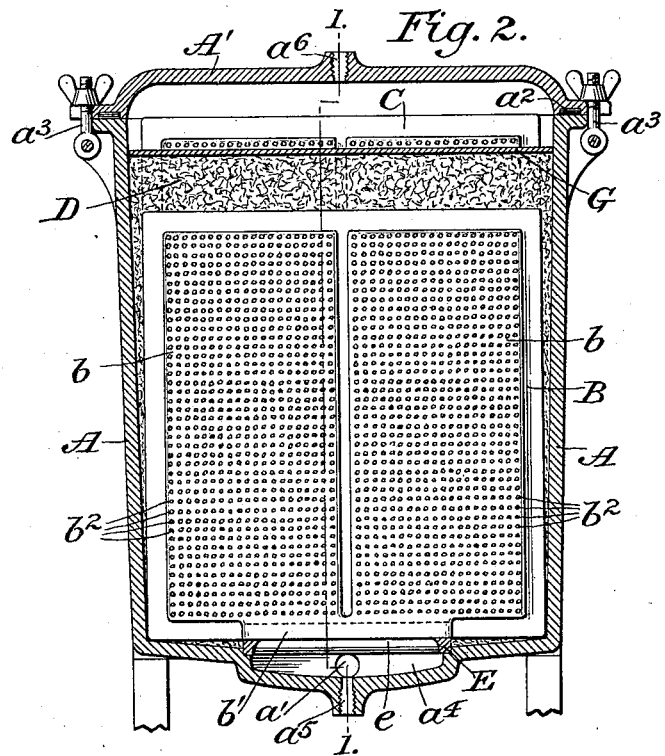
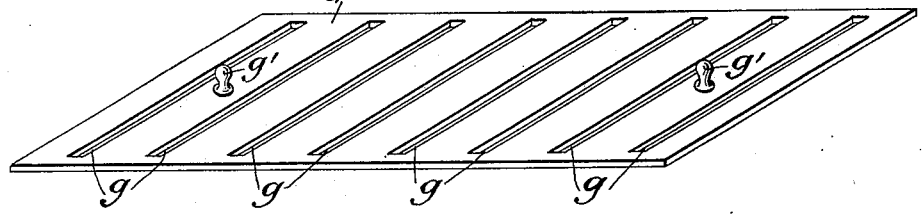
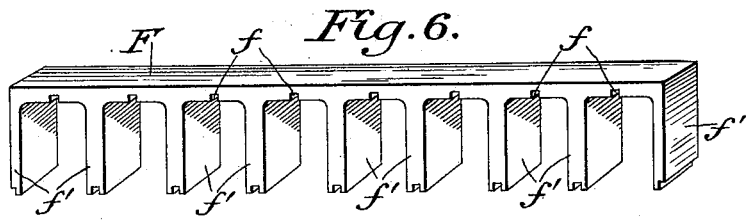

UNITED STATES PATENT OFFICE.

JOSEPH SCHNEIBLE, OF NEW YORK, N. Y.

FILTER.

SPECIFICATION forming part of Letters Patent No. 633,161, dated September 19, 1899.

Application filed April 12, 1898. Serial No. 677,299. (No model.)

*To all whom it may concern:*

Be it known that I, JOSEPH SCHNEIBLE, a citizen of the United States, residing in the city of New York, in the county and State of New York, have invented certain new and useful Improvements in Filters, of which the following is a specification, reference being had to the accompanying drawings, forming a part hereof.

This invention relates more especially to filters of that general class in which is usually employed a filter mass in contradistinction from those in which the filtering material is in sheets or plates.

The objects are to produce a filter which shall have a relatively-large filtering capacity for a given size, presenting a large filtering-surface within a case or shell of comparatively small dimensions, to insure a free inflow or delivery of the liquid to the filtering-surface and a free outflow or discharge of the filtered liquid therefrom, to reduce the time required for the cleaning and setting up of the filter, to make it possible to put the filter mass in place easily and without special apparatus, to obviate the necessity of making tight joints between the different parts of the filter, and to reduce the cost of construction while maintaining or increasing efficiency.

The invention will be more fully described hereinafter with reference to the embodiment thereof which has been chosen for illustration in the accompanying drawings; but as the description of the invention proceeds it will become apparent that the invention can be embodied in other forms and arrangements than that referred to.

In the drawings, Figure 1 is a longitudinal section of a filter which embodies the invention, the section being on the plane indicated by the line 1 1 of Fig. 2. Fig. 2 is a transverse section on the plane indicated by the line 2 2 of Fig. 1. Fig. 3 is a perspective view of one of the delivery-plates and a portion of the supporting-rack. Fig. 4 is a transverse section of one of the delivery-plates on the plane indicated by the line 4 4 of Fig. 3. Fig. 5 is a perspective view of the cover-plate. Fig. 6 is a perspective view of the spacing-rack.

In the filter represented in the drawings a case or tank A of suitable dimensions is provided for the support of the other parts to be referred to hereinafter, and in the construction shown it is provided at one end with an inlet $a$, through which the liquid to be filtered is delivered to be filtered, and with an outlet $a'$, through which the filtered liquid is discharged. If the filter is to be used under pressure, a cover or top $A'$ may be provided, such cover or top having, as shown, a packing-strip $a^2$ and being secured in place removably by hinged bolts $a^3$. A longitudinal drainage-channel $a^4$ is represented in the drawings as formed in the bottom of the case or tank A, the outlet $a'$ communicating therewith.

Within the case or tank are disposed "feed-plates" and "delivery-plates" (as they are conveniently termed herein) in alternation, the filtering material being disposed between them. These plates are so arranged that the liquid to be filtered is delivered to the feed-plates and passes from the feed-plates through the interposed filtering material to the delivery-plates, from which it is discharged. It will be understood readily that these plates may be arranged in different ways to accomplish the result just referred to; but the arrangement shown in the drawings is convenient and practical. As there represented, the hollow or double delivery-plates B communicate with the discharge-channel $a^4$, and the hollow or double feed-plates C extend beyond or above the delivery-plates, so that when the delivery-plates are completely embedded in the filter mass D the feed-plates are exposed above or outside of the filter mass to permit the free access thereto of the liquid to be filtered. Each delivery-plate is so formed as to present a large surface, which is perforated or foraminous to permit the passage of the liquid and to afford free discharge for the liquid which has passed from the filtering material through the plate. It will be evident that the plate may be formed in many different ways; but as represented in the drawings each plate is formed of thin sheet metal, and, except in the case of the plate shown at each end of the series, comprises two sheets or members which are oppositely dished slightly, as at $b$, so that a free passage shall be afforded between them, while their edges are in close contact. At the lower end each plate is formed with a neck, as at $b'$, which is also dished to afford an outlet. Each sheet or member is provided with many perforations $b^2$ in the dished portion. The delivery-plate at each end of the series consists of but one of the sheets or members, formed as already described, the concave side being turned toward the adjacent wall of the case or tank A. The feed-plates C are formed in the same manner as the delivery-plates, but they are larger, so as to extend beyond the delivery-plates in one direction, preferably upward, and they have no outlet except for the many perforations in the dished portions. As a convenient means for supporting and spacing the feed and delivery plates, a rack E is provided to overlie the channel $a^4$ in the bottom of the case or tank A, the rack being formed with slots $e$ to receive the outlet-necks $b'$ of the delivery-plates and with grooves $e'$ to receive the edges of the feed-plates, whereby the feed and delivery plates are supported and properly spaced and free outflow for the filtered liquid from the delivery-plates is afforded.

A spacing bar or rack F may be provided for the purpose of spacing the upper edges of the feed and delivery plates before the filter mass is introduced, such bar or rack having notches $f$ to engage the upper edges of the feed-plates and notched lugs or projections $f'$ to engage the edges of the shorter filter-plates. A cover-plate G, having slots $g$ to receive the upper portions of the feed-plates and handles $g'$, may be provided to be placed in position on top of the filter mass D when the latter has been introduced, thereby protecting the upper surface of the filter mass from the liquid and preventing the mass from being washed up.

In the use of the filter the feed-plates and delivery-plates are placed in position, being steadied at the top by the spacing-bar F, and the filter mass, which has been mixed up with an excess of water, is slowly introduced, so that it may settle uniformly until the required quantity to completely cover the delivery-plates has been introduced, the excess of water being drained off through a drainage-cock $a^5$. The spacing-bar is then removed from the top and the cover-plate applied in its place. The liquid to be filtered is then admitted through the inlet $a$ and overflows the top of the filter mass. If the filtering is to be conducted under pressure, the top or cover $A'$ is previously secured in place, the contained air being discharged through the vent-cock $a^6$. The liquid passes into the feed-plates through the exposed perforations or other inlets and by each plate is distributed over the entire surface of the sheet of filter mass which is interposed between such feed-plate and the adjacent delivery-plate. A corresponding area is afforded by the delivery-plate for the discharge of the filtered liquid, which escapes through the free outlet provided at $b'$. In some cases it may be more convenient or desirable to deliver the liquid to be filtered at $a'$ and to draw off the filtered liquid at $a$; but no change of the apparatus is necessary to permit this, the delivery-plates becoming feed-plates in such cases, and vice versa. It will be observed that the feed and delivery plates do not fit tightly within the case or tank A, except perhaps at the bottom for the purpose of guiding them into place, and that they are consequently surrounded on all sides by the filter mass, which itself packs all of the joints, rendering it unnecessary to provide other means for packing such joints or otherwise rendering them tight. Whenever it is necessary to renew the filtering mass, the feed and delivery plates are easily withdrawn from the top, leaving the whole of the filter mass easily accessible for removal.

What I claim is—

1. A filter comprising a case having a delivery-channel, a series of foraminous hollow delivery-plates having outlets communicating with said channel, a series of foraminous hollow feed-plates adjacent to and alternating with the delivery-plates and separated therefrom by a space to receive and be embedded in the filtering material, and means to deliver to said feed-plates the liquid to be filtered.

2. A filter comprising a case having at its bottom a channel, a series of vertical foraminous and hollow feed-plates and delivery-plates in alternation and separated by a space, and a filter mass in which said plates are embedded, one set of said plates communicating with the space above the filter mass only and the other set of plates communicating with the channel below the filter mass only.

3. A filter comprising a case, a rack having a series of slots and grooves in alternation, a series of foraminous delivery-plates supported in the slots of the rack and having outlets to register therewith, a series of foraminous feed-plates supported in grooves of the rack, said feed-plates being separated from said delivery-plates to receive between them the filtering material, and means to deliver the liquid to be filtered to said feed-plates.

4. A filter comprising a case having in its bottom a longitudinal delivery-channel, a rack overlying said channel and having a series of slots and grooves in alternation, a series of foraminous delivery-plates supported in the slots of the rack and having outlets to register therewith, a series of foraminous feed-plates supported in the grooves of the rack, said feed-plates being separated from said delivery-plates to receive between them the filtering material, and means to deliver the liquid to be filtered to said feed-plates.

This specification signed and witnessed this 2d day of April, A. D. 1898.

JOSEPH SCHNEIBLE.

In presence of—
A. N. JESBERA,
F. M. EGGLESTON.